United States Patent Office 3,223,586
Patented Dec. 14, 1965

3,223,586
ANTI-DEPRESSANT COMPOSITIONS AND METHODS
Frank J. Villani, West Caldwell, N.J., assignor to Schering Corporation, Bloomfield, N.J., a corporation of New Jersey
No Drawing. Filed June 28, 1963, Ser. No. 291,295
7 Claims. (Cl. 167—65)

This application is a continuation-in-part of my co-pending application Serial No. 161,766, filed December 18, 1961, now U.S. Patent 3,188,347.

This invention relates to 5-(4-dimethylaminocyclohexyl)-dibenzo-[a,d]-cyclohepta-[1,4]-diene, the non-toxic acid addition salts thereof, and to the processes for making and using such compositions.

In its composition of matter aspect, the invention resides in the concept of the chemical compound 5-(4-dimethylaminocyclohexyl) - dibenzo - [a,d] - cyclohepta-[1,4]-diene having the structural formula:

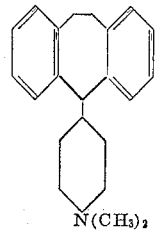

which concept includes the cis and/or trans isomers thereof, as well as the non-toxic acid addition salts thereof. The nomenclature assigned is in accordance with the subject index of Chemical Abstracts (1956) wherein such compounds are named as derivatives of dibenzo-[a,d]-cyclohepta-[1,4]-dienes.

The tangible embodiments of the compositions of matter of this invention possess the inherent applied use characteristic of exerting an anti-depressant effect in mammals. Therefore, in its process-of-use aspect, this invention embraces the concept of administering a therapeutically effective quantity of a 5-(4-dimethylaminocyclohexyl)-dibenzo-[a,d]-cyclohepta-[1,4]-diene to achieve an anti-depressant effect in depressed-state mammals.

The manner and process of making and using the invention will now be described so as to enable one skilled in the art to make and use the same.

Preferably, 5 - (4 - dimethylaminocyclohexyl) - dibenzo-[a,d]-cyclohepta-[1,4]-diene is prepared by a condensation reaction between a dibenzo-[a,d]-cyclohepta-[1,4]-diene-5-one (or a dibenzo-[a,d]-cyclohepta-[1,4]-triene-5-one) and an organometallic derivative of p-halodimethylaniline to form 5-hydroxy-5-(p-dimethylaminophenyl) - dibenzo - [a,d]-cyclohepta - [1,4] - diene (or triene) which is catalytically reduced to the desired compound. Optionally, the desired compound may also be prepared by condensing a magnesium, lithium, or zinc derivative of dibenzo-[a,d]-cyclohepta-[1,4]-diene with a 4-dimethylaminocyclohexanone to produce 5-(4-dimethylamino - 1' - hydroxy - cyclohexyl) - dibenzo - [a,d] - cyclohepta-[1,4]-diene which is dehydrated and reduced to the desired compound.

The initial condensation reaction can readily be effected by contacting the reactants together at either room temperature or preferably at elevated temperatures in an inert anhydrous medium using such inert organic solvents as tetrahydrofuran, dioxane, ether, toluene, xylene, cumene, tetralin, and the like. Preferably, the reaction is effected at about the reflux temperature of the reaction mixture.

The dehydration of the carbinol obtained by the condensation of the 5-organometallic compound with the dimethylaminocyclohexanone can be effected by conventional technique, such as by heating the substance in the presence of alcoholic hydrochloric acid, sulfuric acid, zinc chloride, phosphorous oxychloride, and the like. Conventional techniques may also be used for the hydrogenation of the dehydrated product. Preferably, the substance is hydrogenated under pressure in the presence of a catalyst such as platinum oxide or Raney nickel.

Although it is more convenient to produce the desired compound by the foregoing methods, it should also be realized that, depending on the starting materials available, various modifications may be called for. The following reactions may serve to illustrate the various approaches one skilled in the art might take to form the compound of this invention: (1) condensation of 5-lithiodibenzo - [a,d] - cyclohepta - [1,4] - diene with 4-methoxycyclohexanone to form 5-(4'-methoxycyclohexanol)-dibenzo-[a,d]-cyclohepta-[1,4]-diene which is dehydrated to form 5 - (4' - methoxycyclohexenyl) - dibenzo - [a,d]-cyclohepta-[1,4]-diene. This product, in turn, is hydrogenated and reacted with hydrobromic acid to form 5-(4' - hydroxycyclohexyl) - dibenzo - [a,d] - cyclohepta-[1,4]-diene which is oxidized and the resulting oxidation product reacted with dimethylamine to form the desired compound; (2) catalytic reduction of 5-(p-dimethylaminophenyl)-dibenzo-[a,d]-cyclohepta-[1,4]-diene with platinum oxide in the presence of ethanolic hydrochloric acid; (3) reduction of 5-(p-dimethylaminophenyl)-dibenzo-[a,d]-cyclohepta-[1,4]-diene with lithium metal in ethylamine to the tetrahydro derivative followed by the catalytic hydrogenation of the p-dimethylaminocyclohexenyl moiety to the desired compound; (4) addition reaction of p-anisylmagnesium bromide with dibenzo-[a,d]-cyclohepta-[1,4]-diene-5-one followed by hydrogenation in the presence of platinum oxide and ethanol (effecting hydrogenolysis and simultaneous hydrogenation), demethylation of the resulting ether to the hydroxy compound, oxidation to the ketone, and reductive alkylation of the ketone in the presence of Raney nickel and dimethylamine to the desired compound.

While the foregoing methods are suitable for the preparation of the compound of this invention, the following specific exemplification illustrates the best mode contemplated by the inventor for the preparation of the compound of this invention.

EXAMPLE 1

5-(4-dimethylaminocyclohexyl)-dibenzo-[a,d]-cyclohepta-[1,4]-diene

Step A.—A solution of 40 g. of p-bromodimethylaniline in 400 ml. of anhydrous ether is added portionwise to a suspension of 2.75 g. lithium shot in 50 ml. of ether. The mixture is refluxed on a steam bath with stirring for 4 hours, after which time a solution of 20.8 g. of dibenzo-[a,d]-cyclohepta-[1,4]-diene-5-one in 100 ml. of ether is added and the reaction mixture is stirred and heated on the steam bath for an additional 4 hours, and is then allowed to stand overnight. The dark purple reaction mixture is decomposed with ice water and the organic material is extracted with ether. The ether extracts are combined and extracted thoroughly with 10% aqueous hydrochloric acid and the acid extracts are combined and made basic with ammonium hydroxide solution. The precipitated product is extracted with chloroform and the chloroform is removed by concentration on the steam bath. The crude 5-hydroxy-5-(p-dimethylaminophenyl)-dibenzo-[a,d]-cyclohepta-[1,4]-diene residue is triturated with petroleum ether and the product is recrystallized from a large volume of hexane after "Darco" clarification.

Step B.—Ten grams of 5-hydroxy-5-(p-dimethylaminophenyl)-dibenzo-[a,d]-cyclohepta-[1,4]-diene dissolved in 250 ml. of ethanol containing 2.4 ml. of concentrated hydrochloric acid is reduced in a Parr hydrogenator at room temperature and 60 p.s.i. initial hydrogen pressure in the presence of 0.5 g. of platinum oxide catalyst. After filtering off the catalyst, the filtrate is concentrated to dryness and the residue is dissolved in water and made basic with ammonium hydroxide. The product is extracted with chloroform and after removal of the chloroform, the product is distilled as a viscous yellow oil.

*Step C.*—The product of Part B of this example is adsorbed on alumina in a chromatographic column. The column is eluted first with a pentane-benzene (95–5%) solvent system. After the first elution is complete the column is eluted with a pentane-ether (50–50%) solvent system. The pentane-ether eluate is evaporated to dryness and the residue recrystallized from hexane to yield white crystalline 5-(4-dimethylaminocyclohexyl)-dibenzo-[a,d]-cyclohepta-[1,4]-diene, M.P. 97–100° C.

The pentane-benzene eluate is evaporated to dryness and the residue recrystallized from hexane to yield 5-(4-dimethylaminocyclohexyl) - dibenzo - [a,d] - cyclohepta - [1,4]-diene, M.P. 90–91° C., the stereochemical isomer of the pentane-ether eluate product.

EXAMPLE 2

*5-(4-dimethylaminocyclohexyl)-dibenzo-[a,d]-cyclohepta-[1,4]-diene hydrochloride*

A saturated solution of hydrogen chloride in ethanol is added to a solution containing 7.5 g. of 5-(4-dimethylaminocyclohexyl) - dibenzo - [a,d] - cyclohepta - [1,4] - diene, M.P. 97–100° C. until precipitation is complete. The precipitated product is filtered, washed with ether, and recrystallized from a 50–50% mixture of absolute ethanol and absolute ether to yield the white crystalline 5-(4-dimethylaminocyclohexyl)-dibenzo - [a,d] - cyclophepta-[2,4]-diene hydrochloride, M.P. 272–274° C.

Other acid addition salts of 5-(4-dimethylaminocyclohexyl)-dibenzo - [a,d]cyclohepta - [1,4]diene, such as those formed from hydrobromic acid, phosphorous acid, sulfuric acid, acetic acid, tartaric acid, maleic acid, citric acid, succinic acid, and the like, may be prepared by analogous procedures well-known to those skilled in the art.

Having set forth the details as to how the compounds of this invention are to be made, the inventor will now set forth the manner and method of using such compounds.

While moderate success has been achieved in the treatment of psychopharmacological depression in mammals with some of the presently used anti-depressant compounds, the success has been limited to a relatively small percentage of the depression-states. As a consequence, there exists a need for agents which are more generally applicable, as well as for agents which produce fewer undesirable autonomic and neurologic side-effects. It is therefore an object of this invention to provide a novel composition of matter that will satisfy such needs. Such an object is accomplished by the composition of this invention.

Using standard techniques and standard procedures, the toxicity of the compound of this invention was first evaluated in mice, and then in dogs, with favorable results. Effective antidepressant activity in mammals may be evidenced by laboratory and clinical techniques wherein a depressed subject's reaction to the compositions of this invention is compared to the subject's reactions to chemical compounds known to have an anti-depressant effect. From these tests (tests, for example, such as those found described or referred-to in such articles as by D. R. Maxwell, H. T. Palmer, Nature 191, 84 (1961) and by L. Stein, J. Seifter, Science 134, 286 (1961)), it has been concluded that the compositions of this invention, in their effect upon the central nervous system, cause stimulated effects and altered performance of depressed subjects with few side-effects, and therefore, are useful in the treatment of psychopharmacological depression in mammals caused by both laboratory-induced conditions and by multifarious modern-day stimuli.

The effective dosage of the active ingredient of the composition of this invention depends upon the severity, the stage, and the individual characteristic of each case and will be determined by the attending diagnostician. Generally, a dosage range of from about 0.1 mg. to about 15 mg. per kg. of body weight per day constitutes the overall range, with a range of from about 0.1 mg. to 5 mg. per kg. per day for the preferred form of active ingredient.

The compounds of my invention may be used in the form of pharmaceutical preparations which contain the new compound in admixture with a pharmaceutical carrier suitable for enteral or parenteral administration. In their preferred dosage unit forms the active ingredient is present in amounts of about 5 to 150 mg. Such preparations may be in solid forms, as for example tablets and capsules, or in liquid forms, as for example syrups, elixirs, emulsions and injectables.

In the formulation of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following examples will serve to further exemplify the nature of these various formulations. These examples, however, are not intended and should not be construed in any way so as to limit the scope of the product formulation.

EXAMPLE 3

[Syrup, 25 mg./teaspoonful]

| Ingredient: | Quantity |
|---|---|
| 5 - (4 - dimethylaminocyclohexyl) - dibenzo-[a,d]-cyclohepta - [1,4] - diene hydrochloride _____gm__ | 5.0 |
| Citric acid _____gm__ | 5.0 |
| Sodium citrate _____gm__ | 1.0 |
| Sodium benzoate _____gm__ | 1.0 |
| Sweet orange peel tincture _____ml__ | 50.0 |
| Sucrose _____gm__ | 800.0 |
| Purified water, q.s. to make 1.0 liter. | |

Dissolve successively the 5-(4-dimethylaminocyclohexyl) - dibenzo-[a,d]-cyclohepta-[1,4]-diene hydrochloride, citric acid, sodium citrate, sodium benzoate and sucrose in sufficient water to make approximately 900 ml. Add the sweet orange peel tincture and sufficient water to make the product measure one liter. Agitate until uniform. Filter, using an appropriate filter aid if necessary, until the product is clear.

EXAMPLE 4

[Injectable, 10 mg./ml.]

| Ingredient: | Quantity, gm. |
|---|---|
| 5 - (4 - dimethylaminocyclohexyl)-dibenzo-[a,d]-cyclohepta-[1,4]-diene hydrochloride ___ | 10.0 |
| Sodium chloride, U.S.P. _____ | 9.0 |
| Methylparaben _____ | 1.8 |
| Propylparaben _____ | 0.2 |
| Benzyl alcohol, R.G. _____ | 9.0 |
| Water for injection q.s. to make 1.0 liter. | |

Dissolved methyl and propylparabens in the benzyl alcohol with the aid of heat and agitation. Add this solution to a volume of water for injection equal to 90% of the desired final volume and dissolved with agitation. Add and dissolve the sodium chloride. Add and dissolve the 5-(4-dimethylaminocyclohexyl)-dibenzo-[a,d]-cyclohepta-[1,4]-diene hydrochloride. Add water for injection q.s. to final volume. Filter aseptically through appropriate sterile filter. Fill aseptically into 10 ml. rubber stoppered vials.

EXAMPLE 5

[Tablets, 25 mg.]

| Ingredient: | Quantity, gm. |
|---|---|
| 5-(4-dimethylaminocyclohexyl)-dibenzo-[a,d]-cyclohepta-[1,4]-diene hydrochloride | 250.0 |
| Lactose | 1000.0 |
| Corn starch | 600.0 |
| Corn starch as 10% paste | 50.0 |

Mix the 5-(4-dimethylaminocyclohexyl)-dibenzo-[a,d]-cyclohepta-[1,4]-diene hydrochloride, lactose and corn starch, and pass through a pulverizing mill if necessary. Granulate the mix with the starch paste and add additional water if necessary to make a damp granulation. Pass the granulation through an impact mill to produce 8-12 mesh granules. Spread the granulation on trays and dry in a draft-oven at 35-40° C. Reduce the dried granulation to 16-24 mesh. Blend the foregoing 1900 grams of "wet" granulation with 80.0 gm. of cornstarch and 20.0 g. of magnesium stearate until a uniform mixture is obtained. Compress to 200 mg. tablets on 5/16 inch round punches.

Also, by certain modifications in the 5-position substituents of the dibenzocycloheptene nucleus it is determined by pharmacological evaluation that the toxicity of and the anti-depressant activity of the so-modified composition is not materially affected. For example, 5(4'-dimethylaminocyclohexylidene)-dibenzo-[a,d]-cyclohepta-[1,4]-diene, 5-(4'-dimethylaminophenyl)-dibenzo-[a,d]-cyclohepta-[1,4]-diene, 5-hydroxy-5-(4'-dimethylaminophenyl)-dibenzo-[a,e]-cyclohepta-[1,4]-triene, 5-hydroxy-5-(4'-dimethylaminophenyl)-dibenzo-[a,d]-cyclohepta-[1,4]-diene exhibit the herein disclosed anti-depressant activity. Such modifications to the molecular structure of the inventive concept herein described are, therefore, equivalents of the subject matter sought to be patented, and as such are fully embraced by the inventive concept herein described and claimed.

The following examples illustrate the methods employed for the preparation of the modified compositions of matter of the invention.

EXAMPLE 6

*5-(4'-dimethylaminocyclohexylidene)-dibenzo-[a,d]-cyclohepta-[1,4]-diene*

To a solution of 2.5 g. sodium metal in 200 ml. of ethanol add a solution of 33.5 g. of 5-hydroxy-5-(p-dimethylaminophenyl)-dibenzo-[a,d]-cyclohepta-[1,4]-diene in 200 ml. of absolute ethanol, and stir the resulting mixture for two hours at room temperature. Dropwise, add 14.2 g. of methyl iodide to the stirred mixture and reflux the resulting mixture for 8 hours. Evaporate off the alcohol, in vacuo, suspend the residue in water, and extract with ether. Dry and evaporate off the ether solvent, and recrystallize the resulting residue from dilute methanol.

Dissolve the so-obtained 5-methoxy-5-(p-dimethylaminophenyl)-dibenzo-[a,d]-cyclohepta-[1,4]-diene in 150 ml. of glacial acetic acid and hydrogenate at 50-60° C. in the presence of rhodium (5%) on alumina, at a hydrogen pressure of about 4.3 atmospheres, until the theoretical quantity of hydrogen is absorbed. Filter off the solids, and evaporate the solution to dryness.

Add 150 ml. of 48% hydrobromic acid to the residue and reflux the resulting mixture for 24 hours, and remove the solvent by concentration in vacuo.

Dissolve the resulting residue in water, make basic with sodium hydroxide and extract the product with chloroform. From the chloroform extract, the solvent is stripped off and the residue distilled to yield the desired 5-(4'-dimethylaminocyclohexylidene)-dibenzo-[a,d]-cyclohepta-[1,4]-diene, B.P. 203-207°/1.5 mm.

EXAMPLE 7

*5-(4'-dimethylaminocyclohexylidene)-dibenzo-[a,d]-cyclohepta-[1,4]-diene*

Add a solution composed of 12.7 g. of n-butyl lithium, 100 ml. of ether and 100 ml. of tetrahydrofuran to a solution containing 19.2 g. of dibenzo-[a,d]-cyclohepta-[1,4]-diene in 300 ml. of anhydrous tetrahydrofuran and stir the reaction mixture for 6 hours at room temperature. Add a solution containing 12.7 g. of 4-dimethylaminocyclohexanone in 50 ml. of tetrahydrofuran, warm the resulting mixture on a steam bath for three hours and allow the mixture to stand overnight. Evaporate off the excess tetrahydrofuran, add dilute (25%) hydrochloric acid, and separate the acid layer. To the acid layer add sodium hydroxide to make it basic, then extract with chloroform. Evaporate off the excess solvent and distill to obtain this example.

EXAMPLE 8

*5-hydroxy-5-(4'-dimethylaminophenyl)-dibenzo-[a,d] cyclohepta-[1,4]-diene*

A solution of 40 g. of p-bromodimethylaniline in 400 ml. of anhydrous ether is added portionwise to a suspension of 2.75 g. lithium shot in 50 ml. of ether. The mixture is refluxed on a steam bath with stirring for 4 hours, after which time a solution of 20.8 g. of dibenzo-[a,d]-cyclohepta-[1,4]-diene-5-one in 100 ml. of ether is added and the reaction mixture is stirred and heated on the steam bath for an additional 4 hours, and is then allowed to stand overnight. The dark purple reaction mixture is decomposed with ice water and the organic material is extracted with ether. The ether extracts are combined and extracted thoroughly with 10% aqueous hydrochloric acid and the acid extracts are combined and made basic with ammonium hydroxide solution. The precipitated product is extracted with chloroform and the chloroform is removed by concentration on the steam bath. The crude 5-hydroxy-5-(p-dimethylaminophenyl)-dibenzo-[a,d]-cyclohepta-[1,4]-diene residue is triturated with petroleum ether and the product is recrystallized from a large volume of hexane after "Darco" clarification.

EXAMPLE 9

*5-hydroxy-5-(4'dimethylaminophenyl)-dibenzo-[a,e] cyclohepta-[1,4]-triene*

A solution of 40 g. of p-bromodimethylaniline in 400 ml. of anhydrous ether is added portionwise to a suspension of 2.75 g. lithium shot in 50 ml. of ether. The mixture is refluxed on a steam bath with stirring for 4 hours, after which time a solution of 20.8 g. of dibenzo-[a,e]-cyclohepta-[1,4]-triene-5-one in 100 ml. of ether is added and the reaction mixture is stirred and heated on the steam bath for an additional 4 hours, and is then allowed to stand overnight. The dark purple reaction mixture is decomposed with ice water and the organic material is extracted with ether. The ether extracts are combined and extracted thoroughly with 10% aqueous hydrochloric acid and the acid extracts are combined and made basic with ammonium hydroxide solution. The precipitated product is extracted with chloroform and the chloroform is removed by concentration on the steam bath. The crude 5-hydroxy-5-(p-dimethylaminophenyl)-dibenzo-[a,e]-cyclohepta-[1,4]-triene residue is triturated with petroleum ether and the product is recrystallized from a large volume of hexane after "Darco" clarification.

EXAMPLE 10

*5-(4'-dimethylaminophenyl)-dibenzo-[a,d]-cyclohetpa-[1,4]-diene*

Heat a mixture containing 25 g. of 5-hydroxy-5-(4'-dimethylaminophenyl)-dibenzo-[a,d]-cyclohepta-[1,4]-diene, 78 g. of iodine, 39 g. of red phosphorous, 282 ml. of acetic acid and 28 ml. of water, at reflux temperature for 3 hours with stirring. Filter the resulting hot mixture and pour the filtrate into ice water to yield a yellow precipitate. Filter and suspend in water the yellow precipitate and make the suspension strongly basic with sodium hydroxide. Extract the desired product from the basified suspension, evaporate off the excess solvent and recrystallize the crude product from petroleum ether to yield 5 - (4' - dimethylaminophenyl)-dibenzo-[a,d]-cyclohepta-[1,4]-diene, M.P. 97–100° C.

I claim:
1. A composition of matter adapted when taken internally to cause an anti-depressant effect, said composition in dosage unit form comprising a pharmaceutical carrier in admixture with between 5 and 150 mg. of a compound selected from the group consisting of 5-(4-dimethylaminocyclohexyl) - dibenzo-[a,d] - cyclopheta-[1,4]-diene and the non-toxic acid addition salts thereof.
2. A composition of matter adapted when taken internally to cause an anti-depressant effect, said composition in dosage unit form comprising a pharmaceutical carrier in admixture with between about 5 and 150 mg. of 5 - (4 - dimethylaminocyclohexyl) - dibenzo - [a,d] - cyclohepta-[1,4]-diene.
3. A composition of matter adapted when taken internally to cause an anti-depressant effect, said composition in dosage unit form comprising a pharmaceutical carrier in admixture with between about 5 and 150 mg. of 5-(4-dimethylaminocyclohexyl) - dibenzo - [a,d] - cyclohepta-[1,4]-diene hydrochloride.
4. The method of treating psychopharmacological depression which comprises administering to mammals a therapeutically effective does of a compound selected from the group consisting of 5-(4-dimethylaminocyclohexyl)-dibenzo-[a,d]-cyclohepta-[1,4]-diene and the non-toxic acid addition salts thereof.
5. The method of claim 4 wherein the daily quantity of active ingredient is between about 0.1 to 5 mg. per kilogram of body weight.
6. The method of treating psychopharmacological depression which comprises administering to mammals a therapeutically effective dose of 5-(4-dimethylaminocyclohexyl)-dibenzo-[a,d]-cyclohepta-[1,4]-diene.
7. The method of treating psychopharmacological depressed mammals which comprises administering to mammals a therapeutically effective does of 5-(4-dimethylaminocyclohexyl) - dibenzo - [a,d] - cyclohepta - [1,4]-diene hydrochloride.

References Cited by the Examiner

UNITED STATES PATENTS

| 3,062,884 | 11/1962 | Green | 260—570.8 |
| 3,079,403 | 2/1963 | Weinstock | 167—65 |
| 3,088,871 | 5/1963 | Pfeiffer | 167—65 |
| 3,098,010 | 7/1963 | Everett | 167—65 |
| 3,126,411 | 3/1964 | Bellet | 260—570.8 |

OTHER REFERENCES

Mychajlysyn: Coll. Czech. Chem. Comm., vol. 24, pp. 3955–3957, 1959.

JULIAN S. LEVITT, *Primary Examiner.*

FRANK CACCIAPAGLIA, Jr., *Examiner.*